US012699408B2

(12) United States Patent
Kim et al.

(10) Patent No.: US 12,699,408 B2
(45) Date of Patent: Aug. 4, 2026

(54) COSMETIC PROVIDING SYSTEM

(71) Applicant: LG HOUSEHOLD & HEALTH CARE LTD., Seoul (KR)

(72) Inventors: Hyung Kyu Kim, Seoul (KR); Kyung Sik Jang, Seoul (KR); Jung Yong Lee, Seoul (KR); Kyung Won Kim, Seoul (KR); Jeong Ho Lee, Seoul (KR)

(73) Assignee: LG HOUSEHOLD & HEALTH CARE LTD., Seoul (KR)

( * ) Notice: Subject to any disclaimer, the term of this patent is extended or adjusted under 35 U.S.C. 154(b) by 712 days.

(21) Appl. No.: 17/914,112

(22) PCT Filed: Apr. 22, 2020

(86) PCT No.: PCT/KR2020/005277
§ 371 (c)(1),
(2) Date: Sep. 23, 2022

(87) PCT Pub. No.: WO2021/194004
PCT Pub. Date: Sep. 30, 2021

(65) Prior Publication Data
US 2024/0210967 A1 Jun. 27, 2024

(30) Foreign Application Priority Data
Mar. 27, 2020 (KR) ........................ 10-2020-0037839

(51) Int. Cl.
*G05D 11/13* (2006.01)
(52) U.S. Cl.
CPC .................................. *G05D 11/132* (2013.01)

(58) Field of Classification Search
CPC ............ A45D 44/005; A45D 2044/007; A45D 40/00; G06Q 30/0621; G06Q 30/0641; G05D 11/132; G07F 13/06; G06K 19/06
See application file for complete search history.

(56) References Cited

U.S. PATENT DOCUMENTS 5,643,341 A * 7/1997 Hirsch ................... A61Q 5/065
8/405
7,180,524 B1 * 2/2007 Axelrod ................ G06T 11/001
715/810
(Continued)

FOREIGN PATENT DOCUMENTS

CN 109073471 A 12/2018
JP 2005-274928 A 10/2005
(Continued)

OTHER PUBLICATIONS

"Human Interface," Journal of Human Interface Society, vol. 16, No. 4, 2014, 12 pages total, with a partial English translation.

*Primary Examiner* — Timothy R Waggoner
(74) *Attorney, Agent, or Firm* — Birch, Stewart, Kolasch & Birch, LLP

(57) ABSTRACT
The present disclosure relates to a cosmetic providing system in which information necessary for providing a customized cosmetic can be more easily managed, the cosmetic providing system comprising: a dispenser for providing cosmetics; and a terminal for generating, when a current color and a target color are input, a code which includes information on the current color and information on the target color, and transmitting the generated code to the dispenser, wherein the dispenser can provide a cosmetic corresponding to the code received from the terminal.

20 Claims, 9 Drawing Sheets

(56) References Cited

U.S. PATENT DOCUMENTS

| | | | |
|---|---|---|---|
| 2007/0184415 A1 | 8/2007 | Sasaki | |
| 2007/0222547 A1 | 9/2007 | Stahle et al. | |
| 2015/0021356 A1* | 1/2015 | Witchell | B01F 33/848 |
| | | | 222/23 |
| 2015/0103090 A1* | 4/2015 | Pettigrew | G06F 3/017 |
| | | | 345/157 |
| 2017/0038297 A1 | 2/2017 | Miklatzky et al. | |
| 2017/0154372 A1 | 6/2017 | Balooch et al. | |
| 2017/0228892 A1 | 8/2017 | Nichol et al. | |
| 2018/0008946 A1* | 1/2018 | Macedo | B01F 33/84 |
| 2018/0260871 A1 | 9/2018 | Harvill et al. | |
| 2019/0059560 A1 | 2/2019 | Miklatzky et al. | |

FOREIGN PATENT DOCUMENTS

| | | | |
|---|---|---|---|
| JP | 2007-525293 A | 9/2007 | |
| JP | 2007-299113 A | 11/2007 | |
| JP | 2013-84081 A | 5/2013 | |
| JP | 2020-500611 A | 1/2020 | |
| KR | 10-2010-0026240 A | 3/2010 | |
| KR | 10-2013-0033906 A | 4/2013 | |
| KR | 10-2015-0071476 A | 6/2015 | |
| KR | 10-1660920 B1 | 9/2016 | |
| KR | 10-2016-0147828 A | 12/2016 | |
| KR | 10-2017-0108363 A | 9/2017 | |
| KR | 10-2019-0058953 A | 5/2019 | |
| KR | 10-2019-0129064 A | 11/2019 | |
| KR | 10-2020-0006782 A | 1/2020 | |
| WO | WO 2010/024486 A1 | 3/2010 | |
| WO | WO 2017/077498 A1 | 5/2017 | |

* cited by examiner

FIG. 6
S10
| DISPLAY A COLOR TABLE | — S101 |
↓
| RECEIVE INPUT FOR SELECTING START POINT AND END POINT FROM COLOR TABLE | — S103 |
↓
| ACQUIRE CODE INFORMATION IN WHICH COLOR SELECTED AS START POINT IS CURRENT COLOR AND COLOR SELECTED AS END POINT IS TARGET COLOR | — S105 |
FIG. 7
(a)
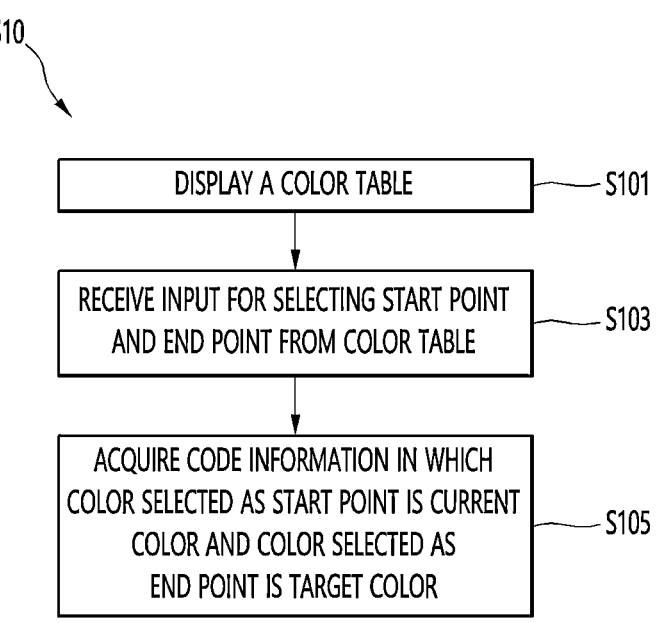
Cooler     Lighter     Best Match     Darker     Warmer
(b)
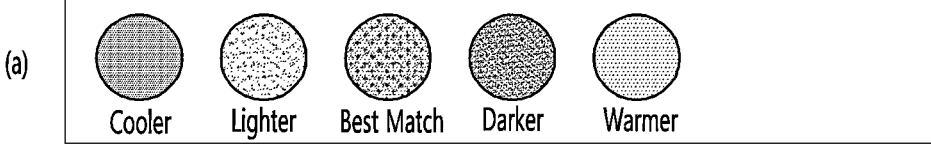
Lighter                    Darker   Warmer                    Cooler
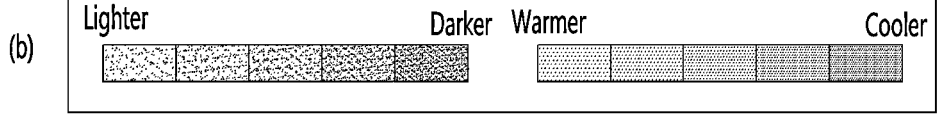

FIG. 10

| 1 | 2 | 3 | 4 | 5 | 6 | 7 | 8 | 9 (optional) | 10 (optional) |
|---|---|---|---|---|---|---|---|---|---|
| | | formulation code | | | | | | | |
| formulation option | starting color(num) | starting color(series) | desired color(num) | desired color(series) | quantity | thickner | volume | additives color | additives quantity |
| P(Permanet) | 1 | N | 1 | N | 2(2oz) | Y(Cream) | 1(10 volume) | B (Beige) | 1 (1/4oz) |
| D(Demi-Permanent) | 2 | A | 2 | A | 3(3oz) | X(Gel) | 2(20 volume) | A (Blue ash) | 2 (1/2oz) |
| S(Semi-Permanent) | 3 | W | 3 | W | 4(4oz) | | 3(30 volume) | C (Clear) | 3 (3/4oz) |
| G(Gray Coverage) | 4 | G | 4 | G | 5(5oz) | | 4(40 volume) | G (Gold) | 4 (1oz) |
| C(Chromashine) | 5 | CG | 5 | CG | 6(6oz) | | | O (Orange) | |
| | 6 | C | 6 | C | | | | R (Red) | |
| | 7 | RB | 7 | RB | | | | V (Violet) | |
| | 8 | RR | 8 | RR | | | | | |
| | 9 | RV | 9 | RV | | | | | |
| | 10 | V | 10 | V | | | | | |
| | 11 | I | 11 | I | | | | | |
| | | B | 12(SHADES OF GRAY) | B | | | | | |
| | | S | 13(GRASS ROOTS) | S | | | | | |
| | | GN(Gray Nights) | 14(ORANGE YOU OBSESSED) | GN(Gray Nights) | | | | | |
| | | GW(Gray Warms) | 15(OUT OF THE BLUE) | GW(Gray Warms) | | | | | |
| | | GR(Gray Reds) | 16(VIVA VIOLET) | GR(Gray Reds) | | | | | |
| | | | 17(DANGEROUSLY RED) | CS(Chromashine) | | | | | |
| | | | 18(MELLOW MY YELLOW) | | | | | | |
| | | | 19(Wild Watermelon) | | | | | | |
| | | | 20(La La Lavender) | | | | | | |
| | | | 21(ROSE GOLD) | | | | | | |
| | | | 22(Totally Teal) | | | | | | |
| | | | 23(Just Peachy) | | | | | | |
| | | | 24(Sub-Lime) | | | | | | |
| | | | 25(Your Fuchsia Looks Bright) | | | | | | |
| | | | 26(Mint to Be) | | | | | | |

| starting color | desired color | canister number | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| 5N | 8V | | | | 14 | 1 | | | 15 | | | 15 | 15 |

COSMETIC PROVIDING SYSTEM

CROSS REFERENCE TO RELATED APPLICATIONS

This application is the National Phase of PCT/KR2020/005277 filed on Apr. 22, 2020, which claims priority under 35 U.S.C. § 119(a) to Patent Application No. 10-2020-0037839 filed in the Republic of Korea on Mar. 27, 2020, all of which are hereby expressly incorporated by reference into the present application.

TECHNICAL FIELD

The present disclosure relates to a cosmetic providing system, and more particularly, to a cosmetic providing system comprising a dispenser providing cosmetics and a terminal communicating with the dispenser, and a method of operating the cosmetic providing system.

BACKGROUND ART

Recently, the kinds of cosmetics have become very diverse according to the development of beauty industry. For example, there are cosmetics for dry skin, neutral skin and oily skin, and the like according to a skin type, cosmetics such as beige and pink beige according to a skin color, and various cosmetics for whitening, for improving wrinkles, for blocking ultraviolet rays, and the like according to functions.

However, since each user has different skin (hair) features or skin troubles, it is limited to meet the needs of all users by providing of various cosmetics. That is, since ingredients and contents of a cosmetic material may be required differently depending on a skin condition of each user, it is difficult to satisfy the needs of all users with only ready-made cosmetics.

Accordingly, a cosmetic providing system that provides customized cosmetics (including hair dye) that match individual skin (hair) characteristics, colors, and tastes of each user has appeared.

Meanwhile, users who have used customized cosmetics may want to use the cosmetics again according to their satisfaction. In this case, there is a problem that the user may not be provided the same cosmetics again only when the user does not remember information (e.g., color, texture, etc.) input when the customized cosmetics was provided in the past. Alternatively, even when the user remembers the information that has been input in the past, there is an inconvenience that the user has to input relevant information again one by one.

In addition, since simulation results displayed when customized cosmetics are provided are often different from actual use results, there is a problem that color reproduction of the customized cosmetics are inaccurate.

DISCLOSURE

Technical Problem

The present disclosure is directed to providing a cosmetic providing system in which information necessary to provide customized cosmetics may be more easily managed.

The present disclosure is directed to providing a cosmetic providing system in which information necessary to provide customized cosmetics may include more various information but may be managed in a simple form.

The present disclosure is directed to providing a cosmetic providing system for providing a simulation that reproduces a color close to an actual result when providing a simulation of customized cosmetics.

The present disclosure is directed to providing a cosmetic providing system for providing an expected result when customized cosmetics are used in a region having characteristics different from those originally intended.

Technical Solution

A cosmetic providing system according to an embodiment of the present disclosure includes a dispenser for providing cosmetics, and a terminal for generating a code including information on the cosmetics and transmitting the code to the dispenser, wherein the dispenser decodes the code received from the terminal to provide cosmetics corresponding thereto.

The code including the information on cosmetics may be indicated to allow a user to recognize at least one piece of information selected from the group including the current color, target color, cosmetic type, amount, and additional ingredients.

The code including the information on cosmetics may be a code including information necessary to calculate a method of manufacturing the cosmetics, and a character itself may indicate the information necessary to calculate the method of manufacturing the cosmetics.

The dispenser may decode using a code interpretation table stored in a storage unit of the dispenser.

The code including information on cosmetics may be indicated to allow a user to recognize at least one piece of information selected from the group including the current color, target color, cosmetic type, amount, and additional ingredients.

The code including information on cosmetics may be a code including information on a cartridge to discharge and a discharge amount.

The dispenser may analyze the code received from the terminal into a product code indicating a color and a factor code indicating texture and convert each analyzed product code and factor code to be interpretable to decode them.

When generating the code, the terminal may generate the code so that user information is further included.

The dispenser may select a cosmetic composition to be included in the cosmetics based on the user information included in the code.

The terminal may display a color table, and when a start point and an end point are input from the color table, the terminal may generate a code in which a color selected as the start point is the current color and a color selected as the end point is the target color.

The terminal may store the color table and a code generation method when one point in the color table is the current color and the other point in the color table is the target color.

The terminal may display the generated code.

The terminal may display the generated code and a simulation that is a prediction result when cosmetics corresponding to the generated code are used.

The terminal may synthesize an image in which alpha value processing is perform after converting a target region in a user image into black and white and an image of a Hue, Saturation, and Value (HSL) color corresponding to the target color to display.

The terminal may display an expected color that is expected to be developed when the cosmetics corresponding to the generated code are used in the current color.

The terminal may further display an expected color that is expected to be developed when the cosmetics corresponding to the generated code are used in a color other than the current color.

A method of operating a cosmetic providing system according to an embodiment of the present disclosure may include receiving, by a terminal, input for a current color and a target color, generating, by the terminal, a code including information on the current color and information on the target color, transmitting, by the terminal, the generated code to a dispenser, and providing, by the dispenser, cosmetics corresponding to the code received from the terminal.

A terminal according to an embodiment of the present disclosure includes an input unit for receiving input for a current color and a target color, a control unit for generating a code including information on the current color and information on the target color input through the input unit, and a communication unit for transmitting the generated code to a dispenser so that cosmetics corresponding to the generated code are provided.

Advantageous Effects

According to an embodiment of the present disclosure, since information necessary to manufacture customized cosmetics is shared between a dispenser and a terminal through a code, there is an advantage that the ease of managing information necessary to provide the customized cosmetics is secured.

In addition, since a code including information necessary to provide the customized cosmetics includes not only information on the cosmetics but also user information, there is an advantage that it is easy to provide cosmetics customized to each user with one code.

In addition, since a target region where the cosmetics are used is processed to black and white and then a target color is applied in an alpha value-processed state, there is an advantage that the accuracy of a simulation is improved, thereby improving the product reliability.

In addition, it is possible to provide an expected result when the cosmetics according to the code are used in a region having characteristics different from those originally intended, and thus it is possible to secure the ease of predicting the use result of a corresponding cosmetic, and accordingly, there is an advantage that the versatility of the customized cosmetics is increased.

DESCRIPTION OF DRAWINGS

FIG. 1 is a block diagram of a cosmetic providing system according to an embodiment of the present disclosure.

FIG. 5 is a flowchart illustrating a method of operating a cosmetic providing system according to an embodiment of the present disclosure.

FIG. 6 is a flowchart illustrating a method for a terminal to receive an input of a current color and a target color according to an embodiment of the present disclosure.

FIG. 7 is an exemplary view illustrating a one-dimensional color table displayed on the terminal according to the embodiment of the present disclosure.

FIG. 10 is an exemplary view of a code system used in a cosmetic providing system according to the embodiment of the present disclosure.

MODES OF THE PRESENT DISCLOSURE

Figure 2:
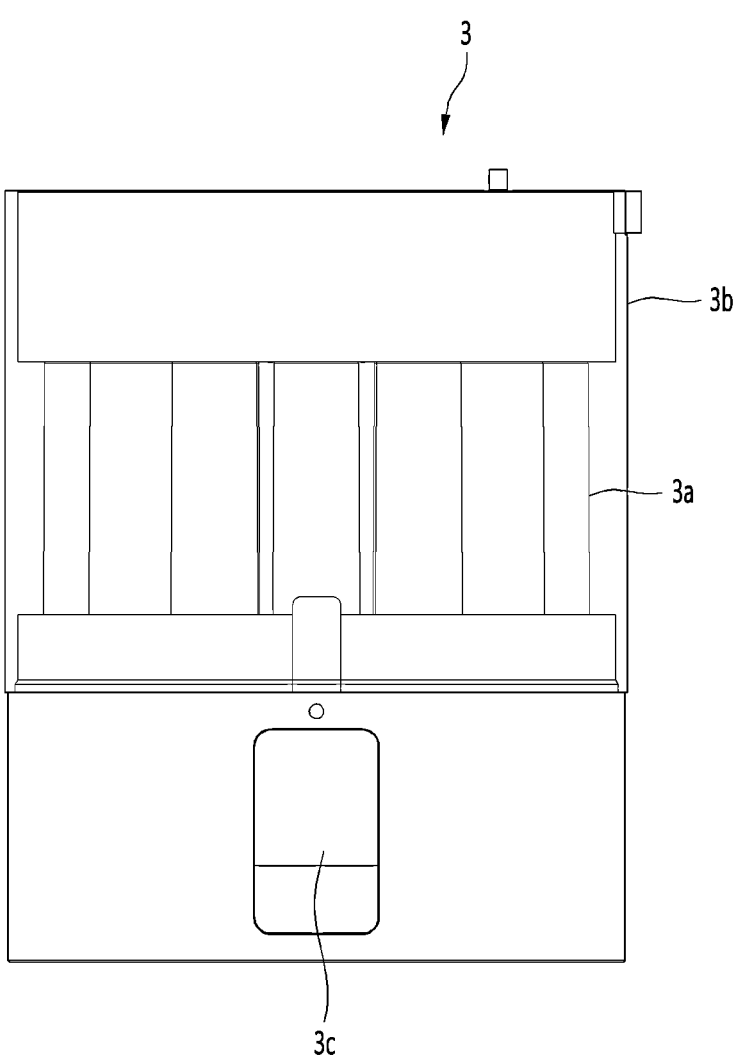
FIG. 2 is a view illustrating a dispenser for providing cosmetics according to an embodiment of the present disclosure.

Hereinafter, embodiments will be described in detail with reference to the accompanying drawings, however, the same components are designated by the same reference numerals, and repeated description thereof will be omitted.

Suffixes "module" and "part" for elements used in the following descriptions are given or used just for convenience in writing the specification, and do not have meanings or roles distinguishable between them.

In addition, in describing embodiments of the present disclosure, when detailed description of a known function is deemed to unnecessarily blur the gist of the present disclosure, the detailed description will be omitted. Further, accompanying drawings are only for easily understanding embodiments disclosed in the present disclosure, and the technical spirit disclosed in the present disclosure are not limited by the accompanying drawings, and it should be understood that the present disclosure includes all modifications, equivalents, and alternatives falling within the spirit and scope of the claims.

It should be understood that, although the terms first, second, and the like may be used herein to describe various elements, these elements are not limited by these terms. The terms are only used to distinguish one element from another.

Elements referred to in singular may be number one or more, unless the context clearly indicates otherwise.

It should be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Figure 1:
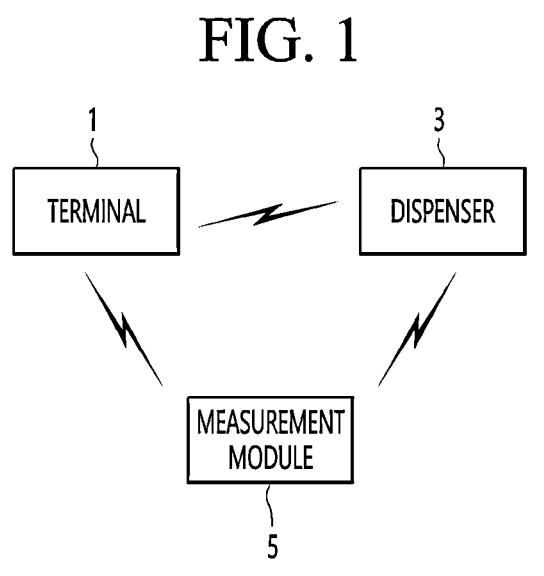

FIG. 1 is a block diagram of a cosmetic providing system according to an embodiment of the present disclosure.

The cosmetic providing system according to the embodiment of the present disclosure may include a terminal 1, a dispenser 3, and a measurement module 5.

The terminal 1, the dispenser 3, and the measurement module 5 may communicate with each other by wire or wirelessly.

The terminal 1 may receive an input for controlling an operation of the dispenser 3, and in this case, the terminal 1 may transmit a signal for controlling the operation of the dispenser 3 according to input information to the dispenser 3.

For example, the terminal 1 may generate and manage a code indicating cosmetics to be provided by the dispenser 3.

In addition, the terminal 1 may display operation information of the dispenser 3. For example, the terminal 1 may display a current state of the dispenser 3, information on the cosmetics to be provided from the dispenser 3, a simulation that is a prediction result when the cosmetics to be provided from the dispenser 3 are used, and the like.

The terminal 1 may be a smart phone, but this is merely illustrative, and may include a wearable device such as a smart watch, a tablet PC, a laptop computer, a desktop, and the like.

The dispenser 3 may be a device that provides cosmetics.

Cosmetics described herein may include not only beauty products used for a face of a user, beauty products used for a hair of the user, products used for nails, toenails, and the like of the user. For example, the cosmetics described herein may include all products such as beauty products used for the user's face such as foundation, sun cream, shadow, tint, lipstick, etc., products used for the user's hair such as hair dyes, and products used for the user's nails or toenails such as manicure, gel manicure, etc.

The dispenser 3 may provide the cosmetics according to a signal received from the terminal 1. According to an embodiment, the dispenser 3 may include a plurality of cosmetic compositions and manufacture the cosmetics by discharging or mixing the provided cosmetic compositions to provide the cosmetics. According to another embodiment, the dispenser 3 may include cosmetics that have already been manufactured to be used immediately and discharge the provided cosmetics to provide the cosmetics.

Hereinafter, it is assumed that the dispenser 3 provides the cosmetics manufactured by discharging and mixing the plurality of cosmetic compositions, but this is merely illustrative for convenience of description, and thus it is reasonable that the present disclosure is not limited thereto.

The measurement module 5 may measure a skin color of the user's face, a color of the user's hair, and the like. The color measured through the measurement module 5 may be transmitted to the terminal 1 or the dispenser 3. For example, the measurement module 5 may transmit the measured color to the terminal 1, and the terminal 1 may receive the measured color from the measurement module 5.

The terminal 1 may select the measured color as a current color to be described later. The user may confirm the color measured through the terminal 1 and determine as the current color.

The measurement module 5 may be implemented as at least one of a camera (not shown) and a colorimeter (not shown), but this is merely illustrative.

FIG. 2 is a view illustrating a dispenser for providing cosmetics according to an embodiment of the present disclosure.

The dispenser 3 may include a plurality of cartridges 3a including the cosmetic composition, and a case 3b for accommodating the cartridges 3a. The cosmetic composition used for manufacturing the cosmetics may be provided in each of the plurality of cartridges 3a. In addition, a door 3c through which the cosmetics are provided may be formed in the case 3b. The cosmetics manufactured by the dispenser 3 may be provided to the user through the door 3c.

Meanwhile, the dispenser 3 shown in FIG. 2 is merely illustrative, and the dispenser 3 may include all devices capable of providing cosmetics.

Figure 3:
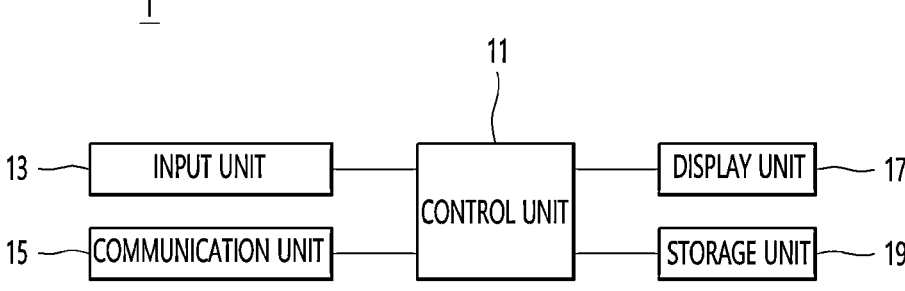
FIG. 3 is a control block diagram of a terminal according to an embodiment of the present disclosure.

FIG. 3 is a control block diagram of a terminal according to an embodiment of the present disclosure.

The terminal 1 may include at least some or all of a control unit 11, an input unit 13, a communication unit 15, a display unit 17, and a storage unit 19.

The control unit 11 may control the overall operation of the terminal 1. The control unit 11 may control each of the input unit 13, the communication unit 15, the display unit 17, and the storage unit 19.

The input unit 13 may receive various types of information from the user. For example, the input unit 13 may receive a current color or a target color.

The current color may refer to a color of a region to which cosmetics that the user intends to use is applied.

The target color may refer to a color to be represented according to the use of cosmetics.

As another example, the input unit 13 may receive an answer in response to a questionnaire about cosmetics to be provided, an input for selecting an amount of the cosmetics to be provided, an input for selecting a formulation of the cosmetics to be provided, and the like.

As still another example, the input unit 13 may receive a code indicating information on the cosmetics to be provided from the dispenser 3.

The code may be a character including information on the cosmetics. For example, the code may include at least one of a recipe code and a UI code to be described later.

The control unit 11 may generate a code including information on the cosmetics.

For example, the terminal 1 may calculate a recipe code including information on a cartridge to discharge and a discharge amount and transmit the recipe code to the dispenser 3, for example, the recipe code may be the same as 7DB35B6A. When the dispenser 3 receives the recipe code consisting of a hexadecimal number such as 7DB35B6A, the dispenser 3 may analyze a product code indicating a color and a factor code indicating texture in the recipe code, convert each analyzed product code and factor code into decimal number from hexadecimal number, and discharge the cosmetic composition based on each converted digit. For example, when the dispenser 3 converts a product code 7DB into a decimal number to obtain 2011, the dispenser 3 may discharge by 2 of a cosmetic composition of a first cartridge, 0 of a cosmetic composition of a second cartridge, 1 of a cosmetic composition of a third cartridge, and 1 of a cosmetic composition of a fourth cartridge 4. In this case, the dispenser 3 has an advantage that it is not necessary to include a separate table for discharging the cosmetic composition according to the code.

Meanwhile, the terminal 1 may allow the user to recognize information included in the character itself and may calculate a UI code in which information necessary for calculating a method of manufacturing the cosmetics is coded to transmit the UI code to the dispenser 3. For example, when assuming that the UI code is P2N8A2Y2, it may refer that, in the cosmetics to be provided corresponding to the code P2N8A2Y2, a formulation option is permanent, a current color is 2N, a target color is 8A, a cosmetic amount is 2, a thickener type is Y, and an oxidizer amount is 2. This exemplifies a case in which the cosmetics are a hair dye, and the cosmetics may be a foundation. When the cosmetics are a foundation, the code may include information such as a current color, a target color, a cosmetic amount, texture type (a lotion/cream type), effective ingredients (moisture/whitening/wrinkle improvement, etc.). In addition, when the cosmetics are a basic cosmetic, the code may include basic information of mixing ingredients suitable for the basic cosmetic. When assuming that the UI code is C4S3TLW2A1, C may refer to cover-type foundation, 4S may refer to the current skin color, 3T may refer to the target color, L may refer to the lotion type, and W2A1 may refer to a second stage of whitening and a first stage of wrinkle improvement. When the dispenser 3 receives a UI code such as P2N8A2Y2 or C4S3TLW2A1, the dispenser 3 may decode the UI code using a code interpretation table stored in the storage unit of the dispenser to discharge the cosmetic composition having an amount corresponding thereto from the cartridge corresponding thereto.

That is, since the recipe code described above is coded to extract from each can at a certain rate, the user may not recognize information on the cosmetics immediately by looking at the code, but the UI code itself may indicate information on the cosmetics. As described above, when the character itself is used as the code indicating the information on the cosmetics, there is an advantage that not only the terminal 1 and the dispenser 3 may recognize the cosmetics to be provided, but also the user may more easily recognize the cosmetics to be provided.

The input unit 13 may be formed of a touch screen or the like or may include a physical key button.

The communication unit 15 may communicate with an external device such as the dispenser 3. The communication unit 15 may transmit/receive signals to/from the external device such as the dispenser 3. The communication unit 15 may include a mobile communication module (not shown) and a short-range communication module (not shown) such as Bluetooth.

The communication unit 15 may transmit a generated code to the dispenser 3.

The display unit 17 may display a screen for receiving various information input from the user. For example, the display unit 17 may display a color table for receiving at least one of the current color and the target color. As another example, the display unit 17 may display a simulation that is a prediction result when cosmetics corresponding to the input or generated code are used.

As described above, the display unit 17 may display information related to an operation of the terminal 1 and information related to an operation of the dispenser 3.

The storage unit 19 may store various information related to the operation of the terminal 1. For example, the storage unit 19 may store the input or generated code. The storage unit 19 may store codes for each user.

In addition, the storage unit 19 may store the color table and a method of generating the code when one point of the color table is the current color and the other point of the color table is the target color. That is, the storage unit 19 may store code information on a color corresponding to each point of the color table, and the control unit 11 may generate a code for selected points based on the code information.

Meanwhile, the components of the terminal 1 shown in FIG. 3 are merely illustrative, some of the components shown in FIG. 3 are omitted, or additional components may be further added in addition to the components shown in FIG. 3.

Figure 4:
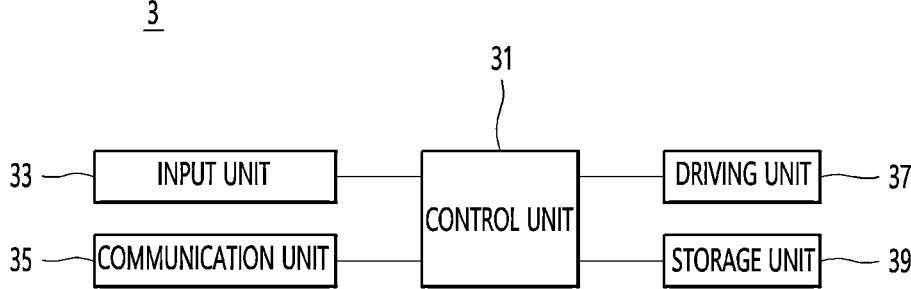
FIG. 4 is a control block diagram of a dispenser according to an embodiment of the present disclosure.

FIG. 4 is a control block diagram of a dispenser according to an embodiment of the present disclosure.

The dispenser 3 may include at least some or all of a control unit 31, an input unit 33, a communication unit 35, a driving unit 37, and a storage unit 39.

The control unit 31 may control the overall operation of the dispenser 3. The control unit 31 may control each of the input unit 33, the communication unit 35, the driving unit 37, and the storage unit 39.

The input unit 33 may receive various information from the user. For example, the input unit 33 may receive a code. In addition, the input unit 33 may receive a cosmetic manufacturing command, a cosmetic manufacturing stop command, and the like.

The input unit 33 may be formed of a touch screen or the like or may include a physical key button.

The communication unit 35 may communicate with an external device such as the terminal 1. The communication unit 35 may receive the code from the terminal 1. In addition, the communication unit 35 may receive the cosmetic manufacturing command, the cosmetic manufacturing stop command, and the like from the terminal 1.

The communication unit 35 may include a mobile communication module (not shown) and a short-range communication module (not shown) such as Bluetooth.

The driving unit 37 may operate so as to provide cosmetics according to the code. The driving unit 36 may discharge a cosmetic composition accommodated in the at least one cartridge 3a so that cosmetics are provided to the user. For example, the driving unit 37 may include a cartridge rotation motor (not shown), a discharge motor (not shown), a container transfer motor (not shown), and the like that operate to discharge cosmetics from the at least one cartridge 3a, but this is merely illustrative for convenience of description.

The storage unit 39 may store cosmetic manufacturing information. For example, the storage unit 39 may store information on cosmetics to be provided according to each character included in the code.

The control unit 31 may extract each of the characters included in the code and obtain information corresponding to the extracted characters from the storage unit 39.

Meanwhile, the components of the dispenser 3 shown in FIG. 4 are merely illustrative, some of the components shown in FIG. 4 are omitted, or additional components may be further added in addition to the components shown in FIG. 4.

Figure 5:
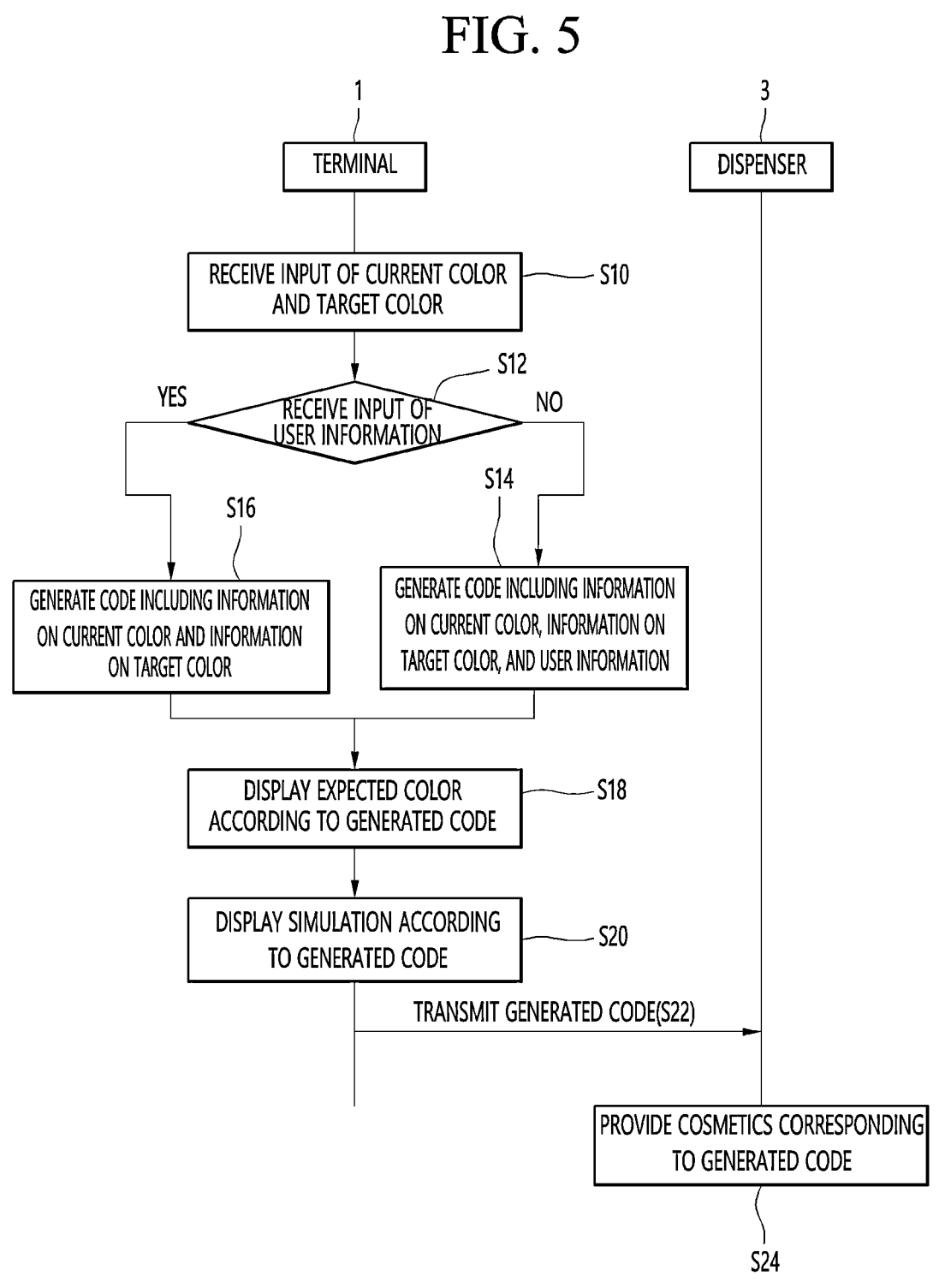

FIG. 5 is a flowchart illustrating a method of operating a cosmetic providing system according to an embodiment of the present disclosure.

The terminal 1 may receive an input of a current color and a target color (S10).

The terminal 1 may receive the input of the current color and the target color through the input unit 13.

The user may input the current color and the target color into the terminal 1. The user may input a color that is the same as or similar to a color of a region where the cosmetics that the user intends to use are used as the current color and may input a color that is the same as or similar to a color desired to be developed in a corresponding region through the cosmetics as the target color.

Next, a method of receiving an input of a current color and a target color according to an embodiment of the present disclosure will be described with reference to FIG. 6.

FIG. 6 is a flowchart illustrating a method for a terminal to receive an input of a current color and a target color according to an embodiment of the present disclosure.

FIG. 6 may be a flowchart in which step S10 of FIG. 5 is embodied.

The display unit 17 may display a color table (S101).

The color table may refer to a table in which a plurality of colors are represented. The color table may include each table that represents a plurality of colors in one-dimensional, two-dimensional, and three-dimensional.

FIG. 7 is an exemplary view illustrating a one-dimensional color table displayed on the terminal according to the embodiment of the present disclosure.

According to an embodiment, the display 17 may display the one-dimensional color table in which a plurality of colors are represented so as to be arranged in one direction as shown in FIG. 7A. In this case, the input unit 13 may receive a command for selecting any one of the plurality of colors included in the one-dimensional color table.

According to another embodiment, the display 17 may display the one-dimensional color table in which a plurality of brightnesses and a plurality of tones are represented so as to be arranged in one direction as shown in FIG. 7B. In this case, the input unit 13 may receive a command for selecting any one of the plurality of brightnesses and a command for selecting any one of the plurality of tones, respectively.

Figure 8:
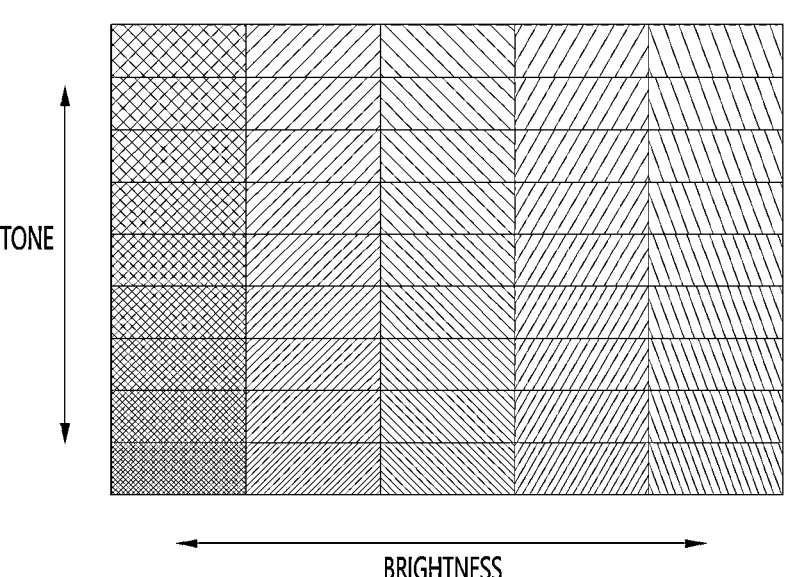
FIG. 8 is an exemplary view illustrating a two-dimensional color table displayed on the terminal according to the embodiment of the present disclosure.

FIG. 8 is an exemplary view illustrating a two-dimensional color table displayed on the terminal according to the embodiment of the present disclosure.

The display 17 may display the two-dimensional color table in which the plurality of colors are represented so as to be arranged in a matrix form as shown in FIG. 8. Specifically, the display 17 may display a color table with the matrix form in which one of a row and a column represents the plurality of tones and the other represents the plurality of brightnesses. In this case, the input unit 13 may receive an input for simultaneously selecting tone and brightness.

In addition, when the color table is displayed in two dimensions as shown in FIG. 8, there is an advantage that the user may select tone and brightness at once and more easily select a color that matches his or her skin color or hair color. That is, since the user only has to select the color that matches his or her color as the current color according to the two-dimensional color table in which colors are represented in various ways according to tone and brightness, it is possible to solve a problem that it is difficult to find the color that matches his or her color when selecting the tone and the brightness respectively Meanwhile, although not shown in the drawings, the display 170 may display a three-dimensional color table. For example, the display 170 may display the three-dimensional color table in which colors are variously represented in each of three axes according to tone, brightness, and other factors (e.g., degree of redness, transparency, etc.).

In addition, color information may be mapped to each color represented in the color table regardless of the number of dimensions of the color table. Specifically, at least one of discharge information (e.g., FA0, C1C, 898, 514, 190, etc.), a pantone color that is the basis of the simulation (e.g., 1R02, 1Y02, 2Y02, 3Y03, 4Y02, etc.) and RGB values of colors represented in the color table (e.g., rgb (254, 233, 224), rgb (254, 242, 222), etc.) may be mapped in each of the colors represented in the color table.

FIG. 6 will be described again.

The control unit 11 may receive an input for selecting the start point and the end point from the color table through the input unit 13 (S103) and may acquire code information in which the color selected as the start point is the current color and the color selected as the end point is the target color (S105).

Figure 9:
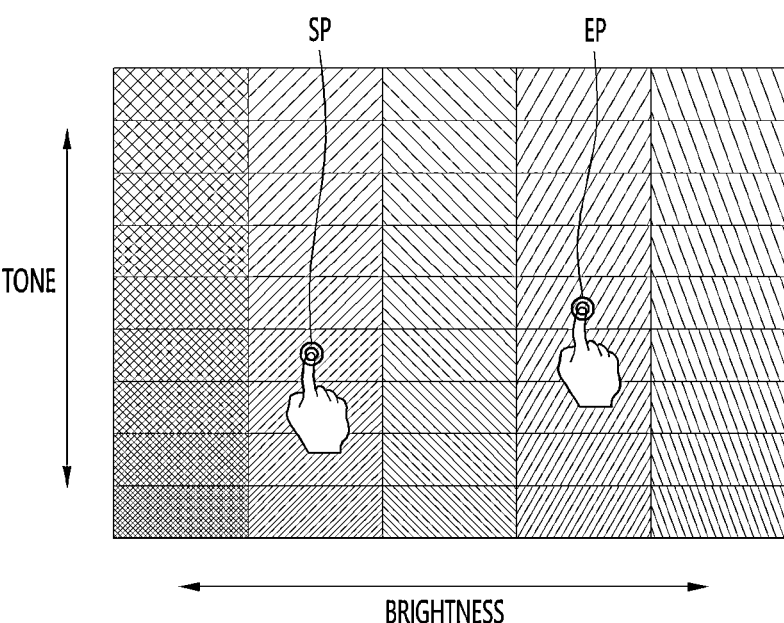
FIG. 9 is an exemplary view illustrating a method for the terminal according to the embodiment of the present disclosure to receive an input for selecting a start point and an end point through a color table.

FIG. 9 is an exemplary view illustrating a method for the terminal according to the embodiment of the present disclosure to receive an input for selecting a start point and an end point through a color table.

The input unit 13 may receive at least one of an input for selecting a starting point SP and an input for selecting an end point EP from the color table.

The control unit 11 may acquire code information in which the color selected as the start point SP is the current color and the color selected as the end point EP is the target color based on color information mapped to the start point SP and color information mapped to the end point EP.

The control unit 11 may generate a code in step S14 or step S16 to be described later using the code information acquired as described above.

FIG. 5 will be described again.

The terminal 1 may determine whether an input of user information has been received (S12).

The user information may include answer information that the user has responded to a questionnaire.

For example, the user information may include a type of cosmetics, a weight of cosmetics, a type of thickener, an oxidizer amount, option information, and the like, and the option information may include a color of an additive, a weight of the additive, and the like, but this is merely illustrative for convenience of description, and the present disclosure is not limited thereto.

As another example, when the cosmetics are products used for the face such as foundation, the user information may include information on texture such as an amount of water, an amount of oil, and a coverage level.

That is, the terminal 1 may determine whether an input for the type of cosmetics, the weight of the cosmetics, the type of the thickener, the oxidant capacity, the option information, and the like has been received.

When the terminal 1 does not receive the input of user information, the terminal 1 may generate a code including information on the current color and information on the target color (S14).

When receiving the input of user information, the terminal 1 may generate a code including information on the current color, information on the target color, and user information (S16).

Next, a method for generating the code by the terminal according to the embodiment of the present disclosure will be described with reference to FIG. 10.

FIG. 10 is an exemplary view of a code system used in a cosmetic providing system according to the embodiment of the present disclosure.

In particular, the code system shown in FIG. 10 is an example, in which a UI code system indicating information on a hair dye is shown, when cosmetics are a hair dye. That is, the code system used in the cosmetic providing system will be described as an example when the cosmetics are a hair dye, but this is merely illustrative for convenience of description, and thus the present disclosure is not limited thereto.

Referring to the example of the code system shown in FIG. 10, a first character of the code may indicate a formulation option, second and third characters of the code may indicate the current color, fourth and fifth characters of the code may indicate the target color, a sixth character of the code may indicate the cosmetic amount, a seventh character of the code may indicate the type of thickener, a eighth character of the code may indicate the oxidizer amount, and ninth and tenth characters of the code may indicate option information. The optional information may include the color of the additive or the weight of the additive. The option information may be omitted.

For example, the code P2N8A2Y2 may be a code determined to be provided with cosmetics in which a formulation option is permanent, a current color is 2N, a target color is 8A, a cosmetic amount is 2 oz, a thickener type is Cream, and an oxidizer amount is 20 volumes.

The control unit 11 may generate a code based on code information mapped to a color corresponding to each point included in the color table.

When such a code is used, there is an advantage that the code may include not only color information of the cosmetics but also user information on the cosmetics.

The code may be transmitted/received between the terminal 1 and the dispenser 3.

Each of the terminal 1 and the dispenser 3 may store the code system as shown in FIG. 10. The terminal 1 and the dispenser 3 have an advantage that the devices may communicate with each other through a code through the code system.

The control unit 11 may control the display unit 17 so as to display the generated code.

Again, FIG. 5 will be described.

The terminal 1 may display an expected color according to the generated code (S18).

The terminal 1 may display an expected color according to the code generated through step S14 or step S16.

The expected color may refer to a color expected to develop when cosmetics according to the generated code are used. The code includes the current color and the target color, so when the color of a region where the cosmetics are used matches the current color included in the code, the expected color may be the same as the target color. However, when the color of the region where the cosmetics are used does not match the current color included in the code, the expected color may be different from the target color. When the color of the region to be used is different from the current color included in the cosmetic code, it may be difficult for the user to predict which color will be developed. Therefore, the display unit 17 may display at least one of an expected color when the cosmetics are used in a region having the current color included in the generated code and an expected color when the cosmetics are used in a region having a color different from the current color included in the generated code.

Figure 11:
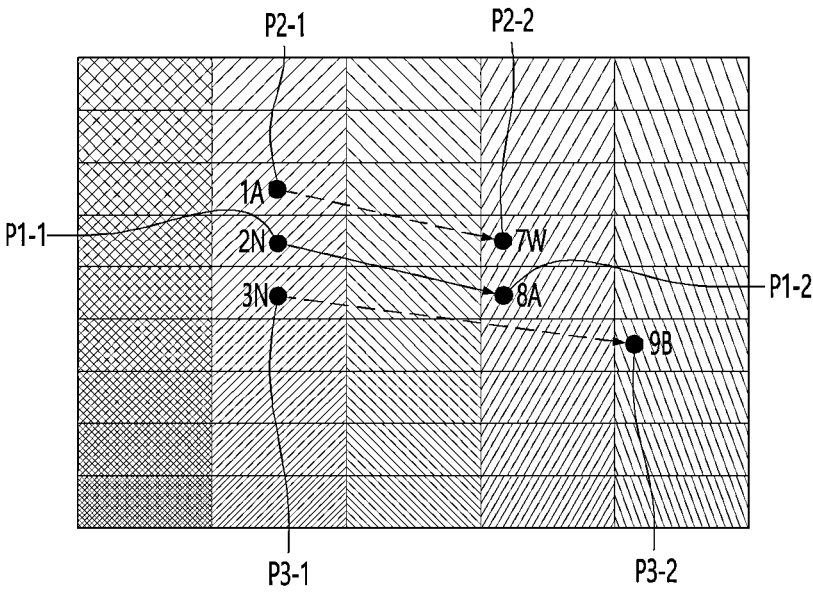
FIG. 11 is an exemplary view illustrating a method for a terminal according to a first embodiment of the present disclosure to display an expected color according to a generated code.

FIG. 11 is an exemplary view illustrating a method for a terminal according to a first embodiment of the present disclosure to display an expected color according to a generated code.

FIG. 11 may be an example of an expected color according to a code that is P2N8A2Y2. That is, FIG. 11 may be an exemplary view illustrating an expected color according to a code in which a current color is 2N and a target color is 8A.

First, the display unit 17 may display a first starting point P1-1 indicating the current color included in the code and a first expected point P1-2 indicating the expected color when cosmetics according to the code are used in a region having a color corresponding to the first starting point P1-1, and in this case, the color of the first expected point P1-2 may be the same as the target color included in the code.

In addition, the input unit 13 may receive a command for selecting a color other than the first starting point P1-1 from the color table displayed on the display unit 17 as a starting point. For example, the input unit 13 may receive a command for selecting a second starting point P2-1 and a command for selecting a third starting point P3-1. In this case, the control unit 11 may calculate an expected color 7W when cosmetics having a code of P2N8A2Y2 are used in a region having a color A1 corresponding to the second starting point P2-1 and the expected color 7W when the cosmetics having the code of P2N8A2Y2 are used in a region having a color 3N corresponding to the third starting point P3-1. The display unit 17 may display a second expected point P2-2 and a third expected point P3-2 indicating the calculated expected color.

That is, the control unit 11 may control the display unit 17 to display an expected color that is expected to be developed when the cosmetics corresponding to the generated code are used in the current color, and to further display the expected color that is expected to be developed when the cosmetics corresponding to the generated code are used in a color other than the current color. In this case, there is an advantage that the user may intuitively confirm the expected color according to various colors of the region where the cosmetics are used.

In addition, the display unit 17 may further display an arrow connected from the first starting point P1-1 to the first expected point P1-2, an arrow connected from the second starting point P2-1 to the second expected point P2-2, and an arrow connected from the third starting point P3-1 to the third expected point P3-2.

In this case, there is an advantage that the user may more easily recognize what colors are developed when cosmetics are used in any color.

In addition, when the display unit 17 displays the arrow connecting the starting point PN-1 and the expected point PN-2, an arrow connecting the starting point P1-1 and the expected point P1-2 may be indicated by a solid line, and the arrows connecting the starting points P2-1 and P3-1 and the expected points P2-2 and P3-2 indicating a color different from the color included in the code may be indicated by a dotted line.

In this case, there is an advantage that the user may more easily confirm which color is generated to be developed by applying a corresponding code to a region having which color.

Figure 12:
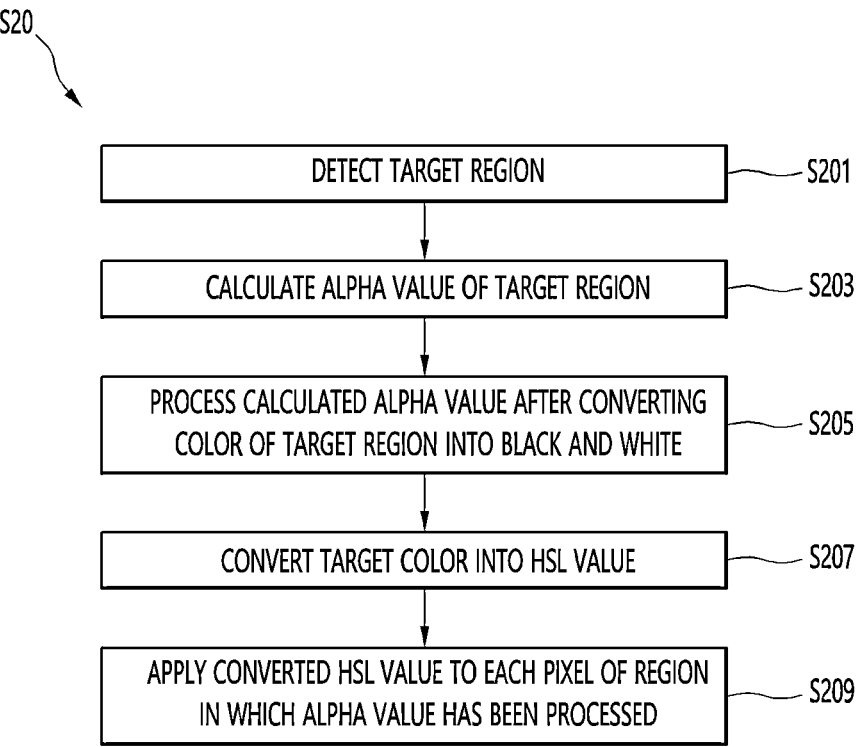
FIG. 12 is an exemplary view illustrating a method for a terminal according to a second embodiment of the present disclosure to display an expected color according to a generated code.

FIG. 12 is an exemplary view illustrating a method for a terminal according to a second embodiment of the present disclosure to display an expected color according to a generated code.

Similarly, FIG. 12 is an example of an expected color according to a code of P2N8A2Y2, and may be an exemplary view illustrating an expected color according to the code in which the current color is 2N and the target color is 8A.

According to the second exemplary embodiment, the display unit 17 may display not only the current color and the target color, but also target colors that vary depending on the current color in a bar form. For example, the display unit 17 may display a target color for each of a color lighter than the current color in a predetermined range and a color darker than the current color in a predetermined range based on the current color.

FIG. 5 will be described again.

The terminal 1 may display a simulation according to the generated code (S20).

The simulation may be an expected result image when cosmetics according to the code generated are used in an image including the user's face (including hair). When displaying such a simulation, it is important that the expected color in the simulation is displayed close to an actual color developed as the cosmetics are used. To this end, the terminal 1 according to the embodiment of the present disclosure may display the simulation according to an order shown in FIG. 13.

Figures 13, 14:
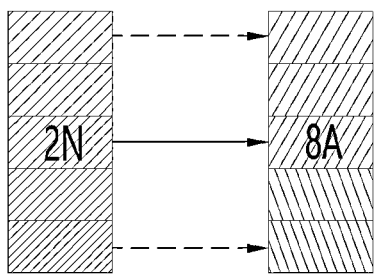
FIG. 13 is a flowchart illustrating a method for the terminal according to the embodiment of the present disclosure to display a simulation.
FIG. 14 is an exemplary view of a code interpretation table according to the embodiment of the present disclosure.

FIG. 13 is a flowchart illustrating a method for the terminal according to the embodiment of the present disclosure to display a simulation.

The terminal 1 may synthesize an image in which alpha value processing is perform after converting a target region in a user image into black and white and an image of a HSL color corresponding to the target color to display. A detailed description thereof is shown in FIG. 13. FIG. 13 may be a flowchart in which step S20 of FIG. 5 is embodied.

The control unit 11 may detect the target region (S201).

The target region may refer to a region where cosmetics are used. The target region may vary depending on the type of cosmetics. For example, when the cosmetics are products used for the entire face such as foundation or sunscreen, the target region may be the face, when the cosmetics are products used for the eyes such as eye shadow, the target region may be an eye region, when cosmetics are products used for the mouth such as tint, lipstick, etc., the target region may be a mouth region, when the cosmetics are products used for nails or toenails such as manicure, gel manicure, etc., the target region may be a nail region or toenail region, and when the cosmetics are products used for hair such as a hair dye, the target region may be a hair region.

Hereinafter, it is assumed that cosmetics are a hair dye, but this is merely illustrative for convenience of description, and thus the present disclosure is not limited thereto.

When cosmetics according to the code are a hair dye, the control unit 11 may detect a hair region in the image as a target region.

According to an embodiment, at this time, the control unit 11 may extract the hair region from the image through the deep learning model Keras and may recognize the detected hair region as the target region.

The control unit 11 may calculate an alpha value of the target region (S203).

According to an embodiment, the control unit 11 may calculate the alpha value based on color information (e.g., RGB) of the target region.

According to another embodiment, after converting the color of the target region to black and white, the control unit 11 may calculate the alpha value based on a brightness of each pixel included in a converted region. For example, with respect to each pixel in the region converted to black and white, the control unit 11 may calculate an alpha value of a pixel having a brightness less than a first value (e.g., 50) as a first alpha value (e.g., 20%), may calculate an alpha value of a pixel having a brightness greater than or equal to the first value and less than a second value (e.g., 150) as a second alpha value (e.g., 50%) greater than the first alpha value, and may calculate an alpha value of a pixel having a brightness greater than or equal to the second value and less than or equal to a third value (e.g., 255) as a third alpha value (e.g., 90%) greater than the second alpha value.

As described above, when the alpha value is calculated for each pixel of the target region, the target color is applied darker in a region with a high probability of being hair, and the target color is applied lighter in a region with a low probability of hair, so that there is an advantage that the accuracy of the simulation is improved.

Meanwhile, since the above-described embodiments as a method of calculating the alpha value are merely illustrative for convenience of description, it is appropriate that the present disclosure is not limited thereto.

The control unit 11 may process the calculated alpha value after converting the color of the target region to black and white (S205).

Then, the control unit 11 may convert the target color into an HSL value (S207) and apply the converted HSL value to each pixel of the region in which the alpha value has been processed (S209).

As such, when the terminal 1 displays the simulation, when the alpha value is processed after processing to black and white first, there is an advantage that the target region is represented more closely to the target color. Specifically, when the terminal 1 processes the alpha value directly when displaying the simulation, there is a problem that the simulation result is not accurate due to the influence of an original hair color even when the target color is applied. That is, even when the target color such as red is applied to blonde or black hair, there is a problem that the target color is not well represented. In addition, when the target color is applied after completely removing the color of the hair, it is represented differently from the actual hair, so that there was a problem of an unnatural image. In the present invention, there is an advantage that the accuracy of color expression is improved by converting the target region into black and white and applying the alpha value calculated for each pixel to each pixel of the converted region.

According to the embodiment, after applying the HSL value, the control unit 11 may perform a separate post-processing for bright hair such as blonde hair.

FIG. 5 will be described again.

The terminal 1 may transmit the generated code to the dispenser 3 (S22).

Specifically, the terminal 1 may transmit the code generated in step S14 or the code generated in step S16 to the dispenser 3.

The dispenser 3 may provide cosmetics corresponding to the generated code (S24).

The dispenser 3 may receive the code from the terminal 1 and provide cosmetics corresponding to the received code. Specifically, the control unit 31 may interpret the received code based on the stored code system and control the driving unit 37 to provide cosmetics corresponding to the code based on the interpretation result.

For example, the control unit 31 may select a cosmetic composition to be included in the cosmetics based on color information and user information included in the code, and control the driving unit 37 to discharge the selected cosmetic composition.

Meanwhile, the dispenser 3 may receive the code directly through the input unit 33 without receiving the code from the terminal 1. As such, even when the code is directly received, the dispenser 3 may interpret the input code and control the driving unit 37 to provide the cosmetics corresponding to the code.

In addition, the user may directly input the code into the terminal 1. That is, the terminal 1, like the dispenser 3, may receive the code through the input unit 13 without generating the code, and in this case, the terminal 1 may transmit the code to the dispenser 3 to provide the cosmetics corresponding to the code.

Therefore, there is an advantage that the user may easily receive the cosmetics by simply inputting the code whenever necessary while remembering the code of the cosmetics.

The dispenser 3 may decode the code in order to provide the cosmetics corresponding to the code.

When the terminal 1 calculates the UI code in which the information necessary for calculating the method of manufacturing the cosmetics (e.g., hair dye) is coded to transmit the UI code to the dispenser 3, since the code already includes how much of which cosmetic composition is discharged, thickeners, oxidizer, additional colors, etc. may be interpreted through a primary decoding, but information on how much of which cosmetic composition is discharged according to the current color and target color may be interpreted through secondary decoding.

To this end, the dispenser 3 may store the code interpretation table for secondary decoding of the code in the storage unit 39. In particular, the code interpretation table may be a table indicating that how much of which cosmetic composition should be discharged in order to develop the current color as the target color.

FIG. 14 is an exemplary view of a code interpretation table according to the embodiment of the present disclosure.

The code interpretation table may indicate the type of cartridge to discharge the cosmetic composition for each of the current color and the target color and the discharge amount from each cartridge.

FIG. 14 is an exemplary view illustrating only a case in which the current color is 5N and the target color is 8V in the code interpretation table. Therefore, when receiving a code such as P5N8V2X2B1, the control unit 31 may control the driving unit 37 to discharge 14 g of a cosmetic composition from a fourth cartridge, 1 g of cosmetic composition from a fifth cartridge, 15 g of a cosmetic composition from an eighth cartridge, 15 g of a cosmetic composition from an eleventh cartridge, 15 g of a cosmetic composition from a twelfth cartridge.

As described above, since the type and amount of the cosmetic composition included in the cosmetics that allow the current color to develop to the target color are interpreted only through secondary decoding according to the code interpretation table, such a method of manufacturing the cosmetics has an advantage of being protected from the outside. In particular, the type and amount of the cosmetic composition used to develop the current color to the target color are know-how acquired through experiences and experiments of hair designers, and the present disclosure has an advantage that it is possible to provide reliable cosmetics to users while protecting such know-how from the outside.

The present disclosure described above may be implemented as computer-readable codes in a medium on which a program is recorded. The computer-readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, and an optical data storage, etc. In addition, the computer may include the control unit of the terminal 1 or the control unit 31 of the dispenser 3. Therefore, the above detailed description should not be construed in a limiting sense in all respects, and should be considered as examples. The scope of the present invention should be determined by rational interpretation of the appended claims, and encompasses all alterations falling within the equivalent scope of the appended claims.

The above description is merely illustrative of the technical spirit of the present invention, and various modifications and variations will be possible without departing from the essential characteristics of the present invention by those skilled in the art to which the present invention pertains.

Therefore, the embodiments disclosed in the present invention are not intended to limit the technical spirit of the present invention, but to explain, and the scope of the technical spirit of the present invention is not limited by these embodiments.

The protection scope of the present invention should be construed by the following claims, and all technical ideas within the equivalent range should be construed as being included in the scope of the present invention.

The invention claimed is:

1. A cosmetic providing system comprising:
a dispenser configured to provide cosmetics; and
a terminal configured to generate a code including information on the cosmetics and transmit the code to the dispenser,
wherein the dispenser decodes the code received from the terminal to provide cosmetics corresponding thereto, and
wherein the terminal is configured to:
display a color table representing a plurality of tones and a plurality of brightnesses, wherein the terminal displays an interactive color table representing a plurality of tones and a plurality of brightnesses and configured to receive a user input, and
generate a code in which a color selected as a start point is a current color and a color selected as an end point is a target color, when a tone and a brightness corresponding to a start point and an end point are input from the color table.

2. The cosmetic providing system of claim 1, wherein the code including the information on the cosmetics is indicated to allow a user to recognize at least one piece of information selected from a group including the current color, target color, cosmetic type, amount, and additional ingredients.

3. The cosmetic providing system of claim 1, wherein the code including the information on the cosmetics is a code including information necessary to calculate a method of manufacturing the cosmetics, and a character itself indicates the information necessary to calculate the method of manufacturing the cosmetics.

4. The cosmetic providing system of claim 1, wherein the dispenser decodes using a code interpretation table stored in a storage unit of the dispenser.

5. The cosmetic providing system of claim 4, wherein the code including the information on the cosmetics is indicated to allow a user to recognize at least one piece of information selected from a group including the current color, target color, cosmetic type, amount, and additional ingredients.

6. The cosmetic providing system of claim 1, wherein the code including the information on the cosmetics is a code including information on a cartridge to discharge and a discharge amount.

7. The cosmetic providing system of claim 1, wherein the dispenser analyzes the code received from the terminal into a product code indicating a color and a factor code indicating texture and converts each analyzed product code and factor code to be interpretable to decode them.

8. The cosmetic providing system of claim 1, wherein the terminal generates the code so that user information is further included when generating the code.

9. The cosmetic providing system of claim 8, wherein the dispenser selects a cosmetic composition to be included in the cosmetics based on the user information included in the code.

10. The cosmetic providing system of claim 1, wherein the terminal stores the color table and a code generation method when one point in the color table is the current color and the other point in the color table is the target color.

11. The cosmetic providing system of claim 1, wherein the terminal displays the generated code.

12. The cosmetic providing system of claim 1, wherein the terminal displays the generated code and a simulation that is a prediction result when cosmetics corresponding to the generated code are used.

13. The cosmetic providing system of claim 12, wherein the terminal synthesizes an image in which alpha value processing is performed after converting a target region in a user image into black and white and an image of a Hue, Saturation, and Value (HSL) color corresponding to the target color to display.

14. The cosmetic providing system of claim 1, wherein the terminal displays an expected color that is expected to be developed when the cosmetics corresponding to the generated code are used in the current color.

15. The cosmetic providing system of claim 14, wherein the terminal further displays an expected color that is expected to be developed when the cosmetics corresponding to the generated code are used in a color other than the current color.

16. The cosmetic providing system of claim 1, wherein the color table is two-dimensional and includes a plurality of rows and a plurality of columns with one of the plurality of rows and the plurality of columns representing the plurality of tones and another of the plurality of rows and the plurality of columns representing the plurality of brightnesses, and wherein the terminal receives a command for simultaneously selecting tone and brightness using the color table.

17. The cosmetic providing system of claim 1, wherein the color table is one-dimensional in which the plurality of brightnesses and the plurality of tones are arranged in one direction.

18. The cosmetic providing system of claim 1, wherein the color table is three-dimensional where colors are variously represented in each of three axes according to tone, brightness, and transparency.

19. A method of operating a cosmetic providing system, the method comprising:

receiving, by a terminal, input for a current color and a target color;

generating, by the terminal, a code including information on the current color and information on the target color;

transmitting, by the terminal, the generated code to a dispenser; and providing, by the dispenser, cosmetics corresponding to the code received from the terminal, wherein the terminal is configured to:

display a color table representing a plurality of tones and a plurality of brightnesses, wherein the terminal displays an interactive color table representing a plurality of tones and a plurality of brightnesses and configured to receive a user input, and generate a code in which a color selected as a start point is the current color and a color selected as an end point is the target color, when a tone and a brightness corresponding to a start point and an end point are input from the color table.

20. A terminal comprising:

an input unit for receiving input for a current color and a target color;

a control unit for generating a code including information on the current color and information on the target color input through the input unit; and a communication unit for transmitting the generated code to a dispenser so that cosmetics corresponding to the generated code are provided, wherein the terminal is configured to:

display a color table representing a plurality of tones and a plurality of brightnesses, wherein the terminal displays an interactive color table representing a plurality of tones and a plurality of brightnesses and configured to receive a user input, and generate a code in which a color selected as a start point is the current color and a color selected as an end point is the target color, when a tone and a brightness corresponding to a start point and an end point are input from the color table.

* * * * *